United States Patent [19]

Williams

[11] 4,268,966

[45] May 26, 1981

[54] RECIPROCATING SAW FOR TREE TOPPING

[76] Inventor: Franklin G. Williams, 1743 N. Valley View Dr., East Layton, Utah 84041

[21] Appl. No.: 126,642

[22] Filed: Mar. 3, 1980

[51] Int. Cl.³ .............................................. B27B 11/00
[52] U.S. Cl. ...................................... 30/372; 30/500; 83/745; 144/34 R
[58] Field of Search ................. 30/372, 166 R, 166 A, 30/500; 83/745; 144/2 Z, 34 R

[56] References Cited

U.S. PATENT DOCUMENTS

| 2,584,821 | 2/1952 | Stennitt | 83/745 X |
| 2,617,452 | 11/1952 | Dowling | 83/745 |
| 2,645,011 | 7/1953 | Otis | 30/372 X |
| 2,759,242 | 8/1956 | Goldman | 30/372 X |
| 2,846,175 | 8/1958 | Sexton | 144/34 R |
| 2,974,694 | 3/1961 | Mattila | 83/745 X |
| 3,755,896 | 9/1973 | Tommerup | 30/372 |

Primary Examiner—Jimmy C. Peters

[57] ABSTRACT

A portable, lightweight, reciprocating saw for topping trees and the like has a frame with a clamp for attaching the frame to a tree. The frame has a pair of interconnected sprockets, one attached through a shaft to a detachable, portable power drill, and the other attached at its periphery to a curved blade. As the second sprocket is rotated, the saw blade reciprocates. The reciprocating saw blade is held against a tree top or branch by means of a biased blade guide adapted to move along a guide rail disposed perpendicularly of the frame in one plane and of the tree in the other plane for essentially automated, non-manual operation of the saw.

7 Claims, 5 Drawing Figures

RECIPROCATING SAW FOR TREE TOPPING

BACKGROUND OF THE INVENTION

This invention relates to the field of portable, reciprocating saws for topping trees. Portable chain saws have been commercially available for years, and have in recent years become popular with a large segment of the populace. The principal use for these saws has been to reduce felled trees and logs to manageable size, in most instances for home fireplace use.

Such chain saws have typically employed chains as the cutting mechanism and have been powered by gasoline engines attached as an integral part of the chain saw. Of necessity, such saws are bulky, heavy and cumbersome. Manufacturers recommend chain saws be used only at ground level or from suitable platforms. They have been recognized as having inherent limitations for use in applications other than cutting up felled logs. Typical of the prior art in this field are the following U.S. Pat.Nos.: 535,424; 1,062,200; 1,544,092; 2,432,562; and 2,974,695. All of these patents disclose devices for use in cutting up logs; although in at least one instance, the device is described as being a "tree felling apparatus". Other devices such as those disclosed in U.S. Pat. Nos. 2,686,351 and 2,783,792 employ non-chain reciprocating blades, but are not designed to accomplish the purpose described here.

None of the prior art patents has addressed the problem of manually carrying a saw to the top of a tree and operating it to top a tree or remove branches. The prior art devices and those on the commercial market do not lend themselves to this specialized field. Such a device would have to be lightweight, compact, and have a detachable power source and means for attaching the saw to a tree during the cutting process, as well as means for holding the saw blade against the tree during hands-off operation of the saw.

It is therefore an objective of this invention to provide a portable, lightweight and compact saw for topping trees having means for attaching the saw to a tree and means for holding the saw blade against the tree during automated operation of the saw.

SUMMARY OF THE INVENTION

According to the invention, a lightweight portable saw meeting the objectives set forth above, has frame means having means for attaching the frame means to a tree trunk or branch. Interconnected sprocket means for gear reduction are rotatably attached to the frame with a first sprocket having means for attachment to a portable power source, such as a hand power drill. A blade-retaining member is rotatably attached at one end thereof to the surface of a second sprocket near the periphery thereof. The blade-retaining member is attached at its other end to a saw blade, such that as the sprocket is rotated, reciprocal motion is imported to the saw blade for cutting a tree top.

Means is provided for both holding the saw blade against the tree and applying pressure against the blade, including a biased blade guide for slideably fitting over the saw blade and applying constant lateral pressure against the back of the saw blade during the reciprocal motion of the blade.

THE DRAWINGS

A preferred embodiment of the invention is illustrated in the accompanying drawings, in which:

FIG. 1 is a top plan view of the saw apparatus showing the saw in place on a tree trunk;

FIG. 2, a side elevational view of the saw apparatus in place on a tree trunk;

FIG. 3, a perspective view of the blade pressure-applying apparatus of the saw;

FIG. 4, an end elevational view of the blade guide from the rear showing a cut-away view of the blade in the guide; and FIG. 5, a side elevational section of the blade guide shown in FIG. 4, showing the blade in place in the guide.

DESCRIPTION OF THE PREFERRED EMBODIMENT

Figure 1:
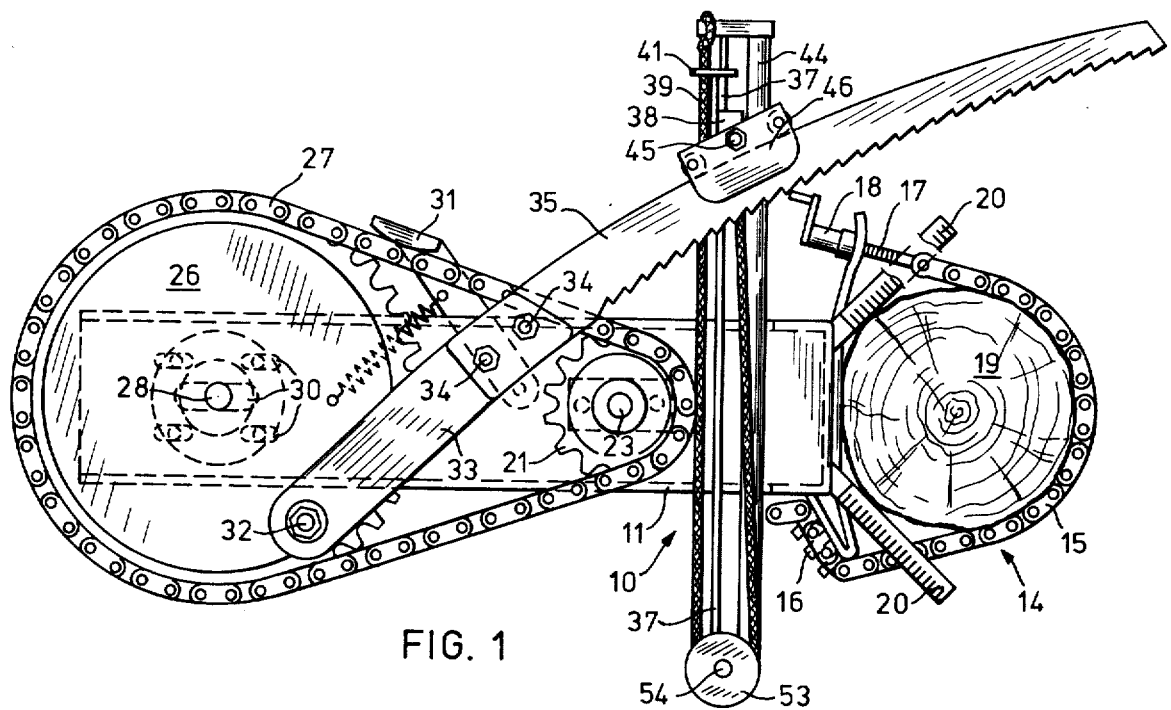
Figure 2:
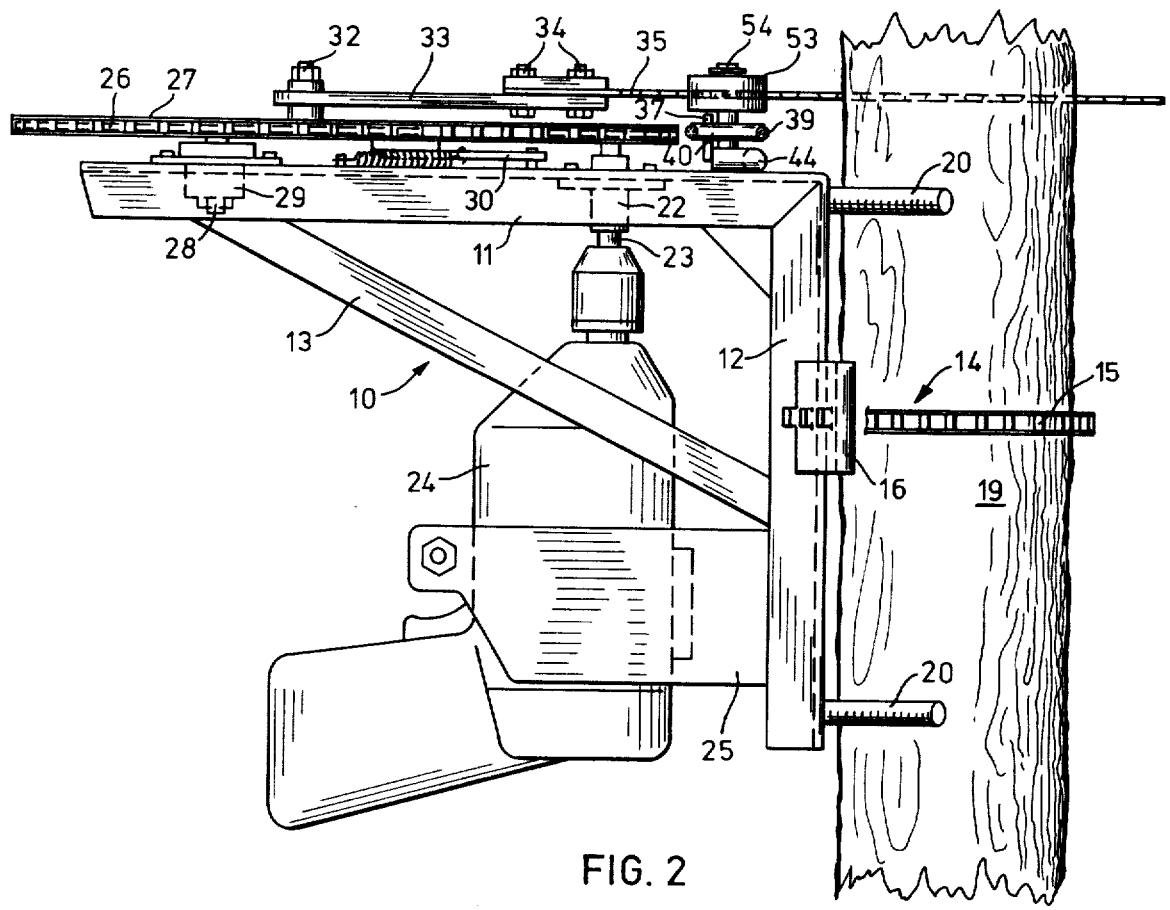

As illustrated in FIGS. 1 and 2, the saw apparatus of the invention has a frame 10 which in turn comprises in this embodiment a pair of channel iron members 11, 12 welded together at respective ends in perpendicular relationship to each other. A brace 13 preferably extends between members 11 and 12 to provide stability and rigidity to frame 10.

Frame 10 is adapted to be secured in place against a tree trunk or tree branch with securing means, which in this embodiment comprises a chain belt securing apparatus 14 having an articulated chain 15, such as used with bicycle and motorcycle drive systems, with locking plate means 16 attached to one lateral side of frame member 12. Locking plate means 16 in this embodiment comprises a plate welded to frame member 12 with a plurality of spaced-apart protrusions for intercepting and holding the links in chain 15.

On the opposite side of frame member 12, means for tightening chain 15 is provided in the form of a threaded bolt 17 attached to an end of chain 15 and threaded receiving means in this embodiment a nut and handle combination 18. In operation, chain 15 is placed around the tree trunk 19 and secured as snugly as possible by interlocking one or more links of chain 15 with the protrusions on locking plate means 16. The handle of the nut and handle combination 18 is then rotated to draw bolt 17 into the nut and thereby tighten chain 15 sufficiently around the trunk 19 to firmly secure frame 10 to trunk 19.

Frame member 12 is also provided with a plurality of outwardly extending alignment rods 20 which serve the purpose of aligning frame member 12 with trunk 19 and providing a broader base against which trunk 19 can be secured to the frame by chain 15.

Upper frame member 11 lies normally in the horizontal position when the saw apparatus is attached to a vertical tree trunk as shown in FIGS. 1 and 2. Frame member 11 has a drive sprocket 21 rotatably attached preferably near the trunk end of frame member 11 through a shaft 22 journaled in a bushing 23 secured in member 11. Shaft 22 at its normally lower end is of sufficient size to be secured in the receptacle of a standard ½ inch portable rotary drill 24, which in turn is removably secured in a retaining means 25 attached to the lower end of frame member 12. In this manner, drill 24 can be detached and carried separately from the saw apparatus up the tree to be secured in place after the saw apparatus has been secured to the tree trunk.

Drive sprocket 21 is interconnected in this embodiment with a second sprocket 26 through chain means 27, preferably a bicycle or motorcycle chain, or the like. The gear reduction from the drive sprocket to the second sprocket is preferably 3 to 1 to provide the desirable reciprocating speed for the saw. Sprocket 26 is rotatably secured to frame member 11 through a shaft 28 which is journaled through a bushing 29 secured in frame member 11. Both shafts 23 and 28 are preferably welded to their respective sprockets 21, 26 to reduce the need for nuts or other securing means on top of the sprockets which could interfere with the operation of the saw. Frame member 11 is slotted 30 below the second sprocket 26 to permit sprocket 26 to be adjusted with respect to the tension on chain 27.

A spring-biased chain slack adjustment member 31 is attached to frame member 11 to guide chain 27 as well as remove slack from the chain during operation of the saw apparatus.

A crank pin 32 attached as by welding to the outer circumference of a second sprocket 26 rotatably secures a saw blade retaining member 33, which has means, such as a plurality of nuts and bolts 34 for securing a saw blade 35. Saw blade 35 in this embodiment is preferably curved and is approximately 7 inches to provide stability and prevent bending or buckling during operation. As sprocket 26 is rotated, pin 32 translates the sprocket's rotary motion into the saw blade's reciprocal motion through saw blade retaining member 33.

Figure 4:
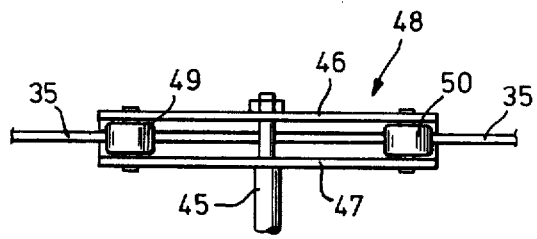
Figure 5:
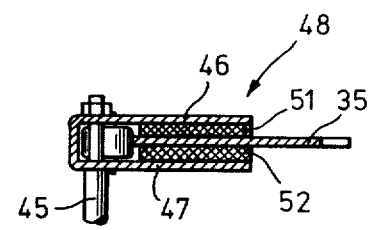
Figure 3:
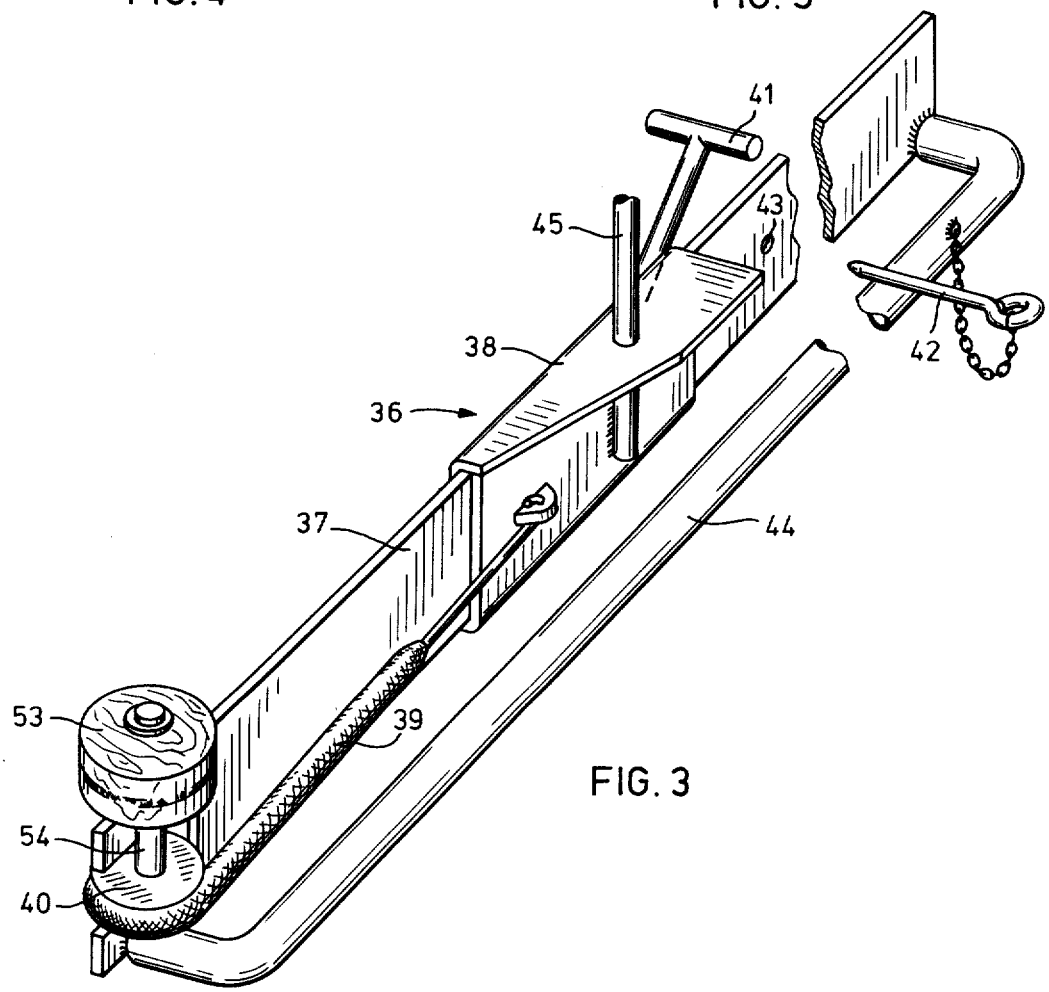

Of particular importance is the apparatus for applying lateral pressure on blade 35 to hold it in position against tree trunk 19 as blade 35 reciprocates and saws through the tree. As shown in additional detail in FIGS. 3, 4 and 5, the guide pressure mechanism 36 has track means which in this embodiment comprises an elongate guide rail member 37 secured as by welding to the upper side of frame member 11, perpendicularly thereof. A rail slide member 38 is adapted to move slidingly along guide rail 37. Preferably, rail slide member 38 is constructed so as to enclose guide rail member 38 as shown in FIG. 3 for greater stability and to prevent rail slide 38 from being pulled from guide rail 37.

Rail slide 38 has biasing means, in this embodiment a bunge cord 39, extending at one end from attachment with rail slide 38 forwardly in the direction of travel of the rail slide when in use around a capstan 40 rotatingly secured at the leading end of guide rail 37. Bunge cord 39 then extends rearwardly of guide rail 37 to a point of attachment (as shown in FIG. 1) at the rearward end of guide rail 37. Rail slide 38 is provided with a handle 41 in this embodiment to aid in drawing rail slide 38 rearwardly against the biasing force of bunge cord 39 to its initial position. In that position, it is secured by a pin 42 inserted ahead of rail studs 38 into an aperture 43 in guide rail 37. A guide rail support bar 44 extends parallel to guide rail 37 and connects therewith at each respective end to provide strength and stability to the guide rail in this embodiment.

An upwardly extending shaft 45 is attached to rail slide 38 and is rotatingly secured at its upper end to a pair of spaced-apart parallel plates 46, 47 which form a saw blade guide 47. At its rearward side, blade guide 48 has a pair of spaced-apart rollers 49, 50 rotatingly attached thereto forming a backstop for saw blade 35. A pair of pads 51, 52 as disposed between plates 46, 47 and serve to receive and slidingly hold saw blade 35.

In operation, rollers 49, 50 of blade guide 48 exert pressure against the back or non-toothed edge of saw blade 35 as the bunge cord 39 draws rail slide 38 forward along guide rail 37. Saw blade 35 reciprocates against the tree and saws through the tree, as the saw blade 35 moves in a reciprocating motion between pads 51, 52 of blade guide 48 and against rollers 49, 50. When saw blade 35 has sawn through the tree and emerges from the other side of the tree trunk, it quickly is drawn by the biasing force of the bunge cord or other similar biasing means to the leading end of guide rail 37. A preferably wooden blade spool 53 is rotatingly disposed on shaft 54 above capstan 40, and serves to catch the toothed side of saw blade 35 and rotate back and forth, thereby preventing damage to the teeth of saw blade 35 until the power source can be turned off.

Whereas, this invention has been described and illustrated in the attached drawings using a preferred embodiment for illustrative purposes, it should be understood that the scope of the invention admits of substantial equivalents and is limited only by the definition afforded by the appended claims.

I claim:

1. An apparatus for topping trees, comprising in combination:
   frame means having a horizontal and vertical elongate frame member attached together at the respective end perpendicularly of each other;
   a power source detachably mounted on said frame means for providing rotationally directed power;
   drive means attached to said frame means and said power source for receiving said rotational power and translating it into reciprocally directed power;
   elongate saw blade means having a serrated side and a non-serrated side and being attached to said drive means at one end, so that said blade means can be reciprocated;
   blade guide means slidingly attached to said blade means along the non-serrated side of the blade means;
   biasing means attached to said blade guide means and said frame means for applying pressure to said blade guide means and transmitting that pressure against the non-serrated side of said blade means; and
   securing means for attaching said frame means to a tree.

2. An apparatus as set forth in claim 1, wherein said biasing means includes track means disposed laterally of said horizontal frame member; track following means slidingly attached to said track means; spring biasing means attached between said track following means and said track means, and attachment means connected to said track following means for connecting to said blade guide means.

3. An apparatus as set forth in claim 1, wherein said elongate saw blade means is curved in the direction of the serrated side.

4. An apparatus as set forth in claim 1, wherein said power source is a half-inch portable drill.

5. An apparatus as set forth in claim 1, wherein said drive means has a pair of sprocket wheels different diameters connected together through a sprocket chain, the smaller of said sprocket wheels being connected to said power source, and the larger of said sprocket wheels being connected to one end of said elongate saw blade means.

6. An apparatus as set forth in claim 1, wherein said securing means has a link chain attached at one end thereof to said vertical elongate frame member with securing means for securing the other end of said chain around a tree top and applying circumferential pressure around the tree top to hold said apparatus in a predetermined position with respect to the tree.

7. An apparatus as set forth in claim 1, wherein said elongate saw blade means has the elongate members attached at respective ends in extended manner, with one member having means for attachment at its other end to the reciprocal drive means, and the other member having a serrated side for cutting the tree when in use.

* * * * *